(12) United States Patent
Yochai

(10) Patent No.: US 9,965,482 B2
(45) Date of Patent: *May 8, 2018

(54) HASH BASED READ AND WRITE OPERATIONS IN A STORAGE SYSTEM

(71) Applicant: Infinidat LTD., Herzliya (IL)

(72) Inventor: Yechiel Yochai, Moshav Aviel (IL)

(73) Assignee: INFINIDAT LTD., Herzliya (IL)

( * ) Notice: Subject to any disclaimer, the term of this patent is extended or adjusted under 35 U.S.C. 154(b) by 234 days.

This patent is subject to a terminal disclaimer.

(21) Appl. No.: 14/312,720

(22) Filed: Jun. 24, 2014

(65) Prior Publication Data

US 2015/0370794 A1 Dec. 24, 2015

(51) Int. Cl.
*G06F 17/30* (2006.01)

(52) U.S. Cl.
CPC .............................. *G06F 17/30097* (2013.01)

(58) Field of Classification Search
CPC ......... G06F 17/30097; G06F 17/30336; G06F 17/30303; G06F 17/3033
See application file for complete search history.

(56) References Cited

U.S. PATENT DOCUMENTS

| 7,890,480 B2* | 2/2011 | Barsness | G06F 17/3033 |
| | | | 707/702 |
| 2012/0166448 A1* | 6/2012 | Li | G06F 17/30097 |
| | | | 707/747 |
| 2012/0226699 A1* | 9/2012 | Lillibridge | G06F 17/30371 |
| | | | 707/747 |
| 2014/0143213 A1* | 5/2014 | Tal | G06F 17/30156 |
| | | | 707/692 |
| 2015/0095346 A1* | 4/2015 | Kimmel | G06F 17/3033 |
| | | | 707/747 |
| 2015/0205680 A1* | 7/2015 | Kimmel | G06F 12/0246 |
| | | | 707/649 |
| 2015/0205727 A1* | 7/2015 | Kimmel | G06F 3/0611 |
| | | | 711/103 |

OTHER PUBLICATIONS

Shalev et al., "Split-ordered lists: Lock-free extensible hash tables", Journal of the ACM, vol. 53 Issue 3, pp. 379-405, May 2006, ACM.*

* cited by examiner

*Primary Examiner* — Leslie Wong
(74) *Attorney, Agent, or Firm* — Reches Patents

(57) ABSTRACT

A method for hash-based writing, the method comprises: receiving a received data entity to be stored in a storage system, wherein the received data entity is associated with received data entity metadata; selecting a selected data structure out of a set of data structures that comprises K data structures; wherein K is a positive integer; wherein for each value of a variable k that ranges between 2 and K, stored data entity metadata that is stored in a k'th data structure out of the set collided with stored data entity metadata that is stored in each one of a first till (k−1)'th data structures of the set; calculating an index by applying, on the received data entity metadata, a hash function that is associated with the selected data structure; determining whether an entry that is associated with the index and belongs to the selected data structure is empty; writing to the entry, if the entry is empty, the received data entity metadata, and storing the received data entity in the storage system in response to a location of the entry in the set; and selecting, if the entry is not empty, a new data structure of the set and repeating at least the stages of calculating and determining.

16 Claims, 7 Drawing Sheets

HASH BASED READ AND WRITE OPERATIONS IN A STORAGE SYSTEM

BACKGROUND

A hash table is a data structure that can map keys to values. A hash function is applied on the key, to compute an index to an entry in the hash table, where the corresponding value (data to be retrieved) can be found.

The hash function further depends on the hash table's size, thus, given a key and a table size, the index is computed by: index=hash-function (key, table-size), where the index is between one and the number of entries in the table.

A good hash function should spread the computed indices uniformly across the table. However, in practice the hash function sometimes produces the same index to different keys, a state which is called hash collision.

The chance for collisions is determined not only by the function quality, but also by the ratio between the number of entries (x) in the table and the number of keys (y) needed to be supported by the hash table.

The chance for collisions for a good function is expressed by a formula: $(1-1/y)^{**}x$.

A larger ratio (a larger number of entries comparing to the number of keys) decreases the amount of collisions. In a case where the number of entries is equal to the number of keys, y=x, the formula results $(1-1/x)^{**}x=1/e$ (e=2.7), i.e., around 1/3 to 1/2 of the keys are subject to collision.

All collision resolution strategies require that the keys be stored in the table entries together with the associated values. The keys are required to be stored in the entries, so as to check whether a produced index points to an entry with the requested key.

Popular collision resolution strategies employ linked lists for storing the collided keys and corresponding values. For example, each entry in the hash table may point to a head of a linked list. The linked list requires that in addition to each key and value pair, a pointer is also stored, for referring to the next key-value pair with the same produced index.

Increasing the number of entries of the hash table reduces the chances for collisions, but consumes memory resources for storing the enlarged table. On the other hand, if the number of entries is reduced, still memory is consumed by the extra pointers required to manage the linked lists of the collided keys.

There is a growing need to provide an effective hash-based solution to writing and reading data entities.

SUMMARY

According to an embodiment of the invention various methods may be provided and are described in the specification. According to various embodiments of the invention there may be provided a non-transitory computer readable medium that may store instructions for performing any of the methods described in the specification and steps thereof, including any combinations of same. Additional embodiments of the invention include a mass storage arranged to execute any or all of the methods described in the specification above, including any stages—and any combinations of same.

According to an embodiment of the invention there may be provided a non-transitory computer readable medium that stores instructions that once executed by a computer cause the computer to perform the stages of receiving a received data entity to be stored in a storage system, wherein the received data entity is associated with received data entity metadata; selecting a selected data structure out of a set of data structures that comprises K data structures; wherein K is a positive integer; wherein for each value of a variable k that ranges between 2 and K, stored data entity metadata that is stored in a k'th data structure out of the set collided with stored data entity metadata that is stored in each one of a first till (k−1)'th data structures of the set; calculating an index by applying, on the received data entity metadata, a hash function that is associated with the selected data structure; determining whether an entry that is associated with the index and belongs to the selected data structure is empty; writing to the entry, if the entry is empty, the received data entity metadata, and storing the received data entity in the storage system in response to a location of the entry in the set; selecting, if the entry is not empty, a new data structure of the set and repeating at least the stages of calculating and determining.

According to an embodiment of the invention there may be provided a storage system that comprises a processor, a memory and a permanent layer; wherein the processor is arranged to receive a received data entity to be stored in a storage system, wherein the received data entity is associated with received data entity metadata; select a selected data structure out of a set of data structures; calculate an index by applying, on the received data entity metadata, a hash function that is associated with the selected data structure; determine whether an entry that is associated with the index and belongs to the selected data structure is empty; write to the entry, if the entry is empty, the received data entity metadata; wherein the permanent layer is arranged to store the received data entity in the storage system in response to a location of the entry in the set; wherein the processor is further arranged to select, if the entry is not empty, a new data structure of the set and repeating at least the stages of calculating and determining; wherein the memory is arranged to store the set of data structures; wherein the set of data structures comprises K data structures; wherein K is a positive integer; wherein for each value of a variable k that ranges between 2 and K, stored data entity metadata that is stored in a k'th data structure out of the set collided with stored data entity metadata that is stored in each one of a first till (k−1)'th data structures of the set.

According to an embodiment of the invention there may be provided a method that may include receiving a received data entity to be stored in a storage system, wherein the received data entity is associated with received data entity metadata; selecting a selected data structure out of a set of data structures that comprises K data structures; wherein K is a positive integer; wherein for each value of a variable k that ranges between 2 and K, stored data entity metadata that is stored in a k'th data structure out of the set collided with stored data entity metadata that is stored in each one of a first till (k−1)'th data structures of the set; calculating an index by applying, on the received data entity metadata, a hash function that is associated with the selected data structure; determining whether an entry that is associated with the index and belongs to the selected data structure is empty; writing to the entry, if the entry is empty, the received data entity metadata, and storing the received data entity in the storage system in response to a location of the entry in the set; and selecting, if the entry is not empty, a new data structure of the set and repeating at least the stages of calculating and determining.

The received data entity may be an object and the received data entity metadata is an object identifier.

The K repetition of the selecting of the selected data structure results in scanning the set, starting from a first data structure.

The method may include storing the received data entity at a target address that is responsive to the location of the entry in the set; and wherein each entry of the set does not store the target address.

The each entry of the set may only store a received data entity metadata of a received data entity that is associated with the entry.

The method may include storing the received data entity at a physical address that is responsive to the location of the entry in the set.

The method may include storing the received data entity at a virtual address that is responsive to the location of the entry in the set According to an embodiment of the invention there may be provided a method for hash-based reading, the method may include receiving a request to read a requested data entity that is stored in a storage system and is associated with a requested data entity metadata; selecting a selected data structure out of a set of data structures that may include K data structures; wherein K is a positive integer; wherein for each value of a variable k that ranges between 2 and K, stored data entity metadata that is stored in a k'th data structure out of the set collided with stored data entity metadata that is stored in each one of a first till (k−1)'th data structures of the set; calculating an index by applying, on the requested data entity metadata, a hash function that is associated with the selected data structure; wherein the index is associated with an entry of the selected data structure; determining whether there is a match between (a) stored data entity metadata that is stored in the entry and (b) the requested data entity metadata; providing, if there is a match, a data entity that is associated with the entry; selecting, if there is no match, a new data structure of the set and repeating at least the stages of calculating the index and determining whether there is a match.

The requested data entity may be an object and the requested data entity metadata is an object identifier.

The stored data entity metadata may include a virtual address of the stored data entity.

The K repetition of the selecting of the selected data structure result in scanning the set, starting from a first data structure.

The data entity that is associated with the entry may be stored at a target address that is determined in response to a location of the entry in the set.

Each entry of the set may only store stored data entity metadata of the received data entity that is associated with the entry.

The physical address in which the data entity is stored may correspond to a location of the entry in the set of data structures.

The virtual address assigned to the data entity by the storage system may correspond to the location of the entry in the set of data structures.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
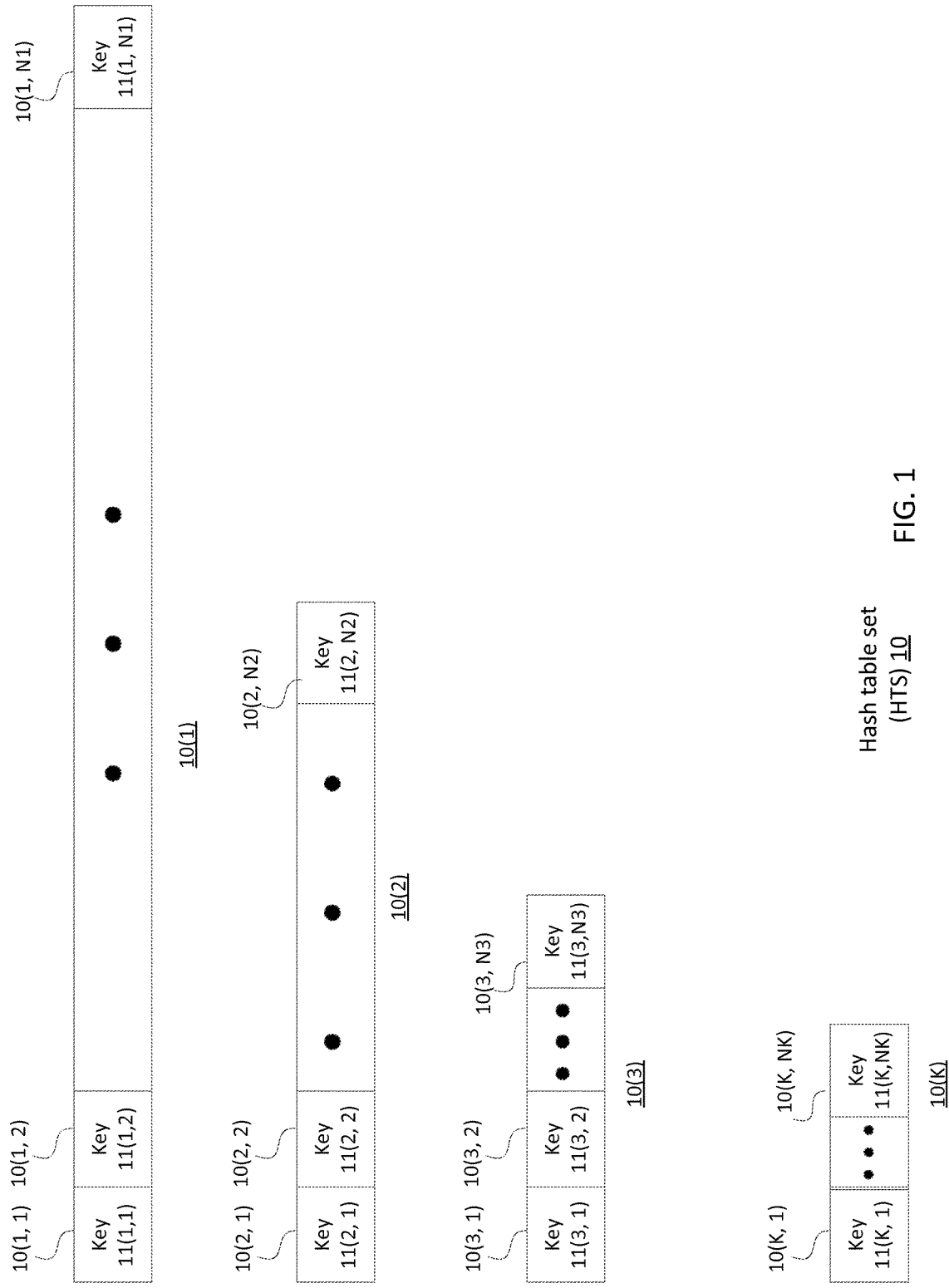
FIG. 1 illustrates a set of hash tables according to an embodiment of the invention.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

There are provided, systems, methods and non-transitory computer readable media for hash-based read and write.

According to an embodiment of the invention a hash function is applied on a key that is a data entity metadata to provide a hash-value (an index that points to an entry of a hash table of a set of hash tables).

Only a single key is associated with each entry of each hash table. According to an embodiment of the invention each entry of each hash table may store only the key and does not store a target address allocated to the received data entity by the storage system. The target address may be calculated in response to at least the location of the entry in the set of hash tables.

Furthermore—according to an embodiment of the invention the hash tables do not explicitly store information related to the collisions (such as a pointer to a linked list of collided keys). When writing a new data entity—in case of a collision—a new entry is searched for that new data entity.

There is provided a set of hash tables including a primary table that is relatively small as the number of entries of the primary table is equal to the number of keys to be supported. The total number of entries in all tables is about twice the number of keys to be supported.

Instead of storing in each entry of a hash table both a key and a value, only the key is stored, while the value is not stored, but is inferred from the index of the entry, e.g., by applying a formula on the index. A target address is allocated to the received data entity by the storage system. The target address is not stored in the entry and may be calculated in response to at least the location of the entry in the set of hash tables Instead of managing linked lists for collided keys, which require using pointers, the hash mechanism uses additional smaller hash tables for storing the collided keys. The hash mechanism includes multiple (K) hash tables, such as hash tables 10(1), 10(2), 10(3) and 10(K) of FIG. 1, wherein each hash table k (1<=k<=K) stores keys that collide with keys in hash table (k−1) and with keys in any former table. For example, table 10(2) includes keys that collide with keys in table 10(1) and table 10(3) includes keys that collide with keys in tables 10(2) and table 10(1).

A first hash table, e.g. table 10(1), is associated with a first hash function for calculating an index in the first hash table. First hash table 10(1) includes N1 entries, such as entries 10(1,1), 10(1,2) and 10(1,N1), wherein N1 may be the number of elements (i.e., elements with different keys) required to be supported by the hash mechanism. The entries of the table, collectively denoted as 10, includes first keys and does not include associated values, for example, entry 10(1,1) includes a first key 11(1,1), entry 10(1,2) includes a first key 11(1,2), and entry 10(1,N1) includes a first key 11(1,N1). No other value is needed to be stored in the entries, as the value may be calculated by a formula involving the index (e.g., index n1) within the table, for example: n1*5. The first keys are keys that did not collide with any existing key when the first keys were added to the hash mechanism.

A second hash table, e.g. table 10(2), is used for storing second keys that form collisions with the first keys (duplicate indices) when trying to apply the first hash function on the second keys. That is to say, the first hash function produces an entry-index and the corresponding entry in the first hash table is already occupied by another key. A second hash function is used for producing indices for the second hash table and may be a different hash function from the first hash function.

The second hash table includes N2 entries that respectively includes N2 second keys, for example, entries 10(2,1), 10(2,2) and 10(2,N2) respectively includes second keys 11(2,1), 11(2,2) and 11(2,N2). N2 may be the number of keys expected to be collided with some of the first keys, when trying to apply the first hash function on the second keys.

As explained in the background, when the number of entries in the hash table is equal to the number of keys, the chance for collision is 1/e, and therefore N2 is equal to N/e, or between N1/3 to N1/2. For the sake of simplicity, in the following examples, it is assumed that N2=N1/2, as can be shown from FIG. 1 where hash table 10(1) is twice as long as table 10(2) and table 10(2) is twice as long as table 10(3).

A third hash table, e.g. table 10(3), is used for storing third keys that form collisions with first keys when trying to apply the first hash function on the third keys, and also form collisions with second keys when trying to apply the second hash function on the third keys. There are N3 entries in hash table 10(3), wherein N3 may be the number of keys expected to be collided with some of the second keys.

A k'th hash table is used for storing keys that forms collisions when applying any of the previous k−1 hash functions. A k'th hash function is used for producing indices for the k'th hash table and is preferably different from any of the other hash functions used for the other hash tables. The k'th hash table includes Nk entries, which equals, for example Nk−1/2, or by using another presentation: $N1/(2^{k-1})$.

The last table, 10(K), includes all the remaining keys and usually includes only few keys, e.g., 8-16 keys. The few entries in this K'th hash table are searched sequentially without using a formula for accessing a certain index.

The number (K) of hash tables is dictated by the total number of supported keys (N1), e.g., for 1M keys, there are 17-18 hash tables, and for 1G keys there are 27-28 tables. The total number of entries in all tables is about twice the total number of supported keys, i.e. 2*N1.

The described hash mechanism can be applied in cases where the value associated with the key can be calculated using a formula that involves the entry-index as a variable of the formula, for example, the value associated with index m in table j may be: C1*m+C2*j, wherein C1 and C2 are constant values.

The hash mechanism can be implemented in storage systems that need to find an address of a data element according to some key, wherein all the data elements have fixed size content, therefore an index produced by the hash function, dictates the address where the data element is to be stored.

The address may be a physical address (see, for example physical address PA 840 of FIG. 7), a logical address, and the like. The logical address may belong to different levels of virtual memory spaces.

Figure 7:
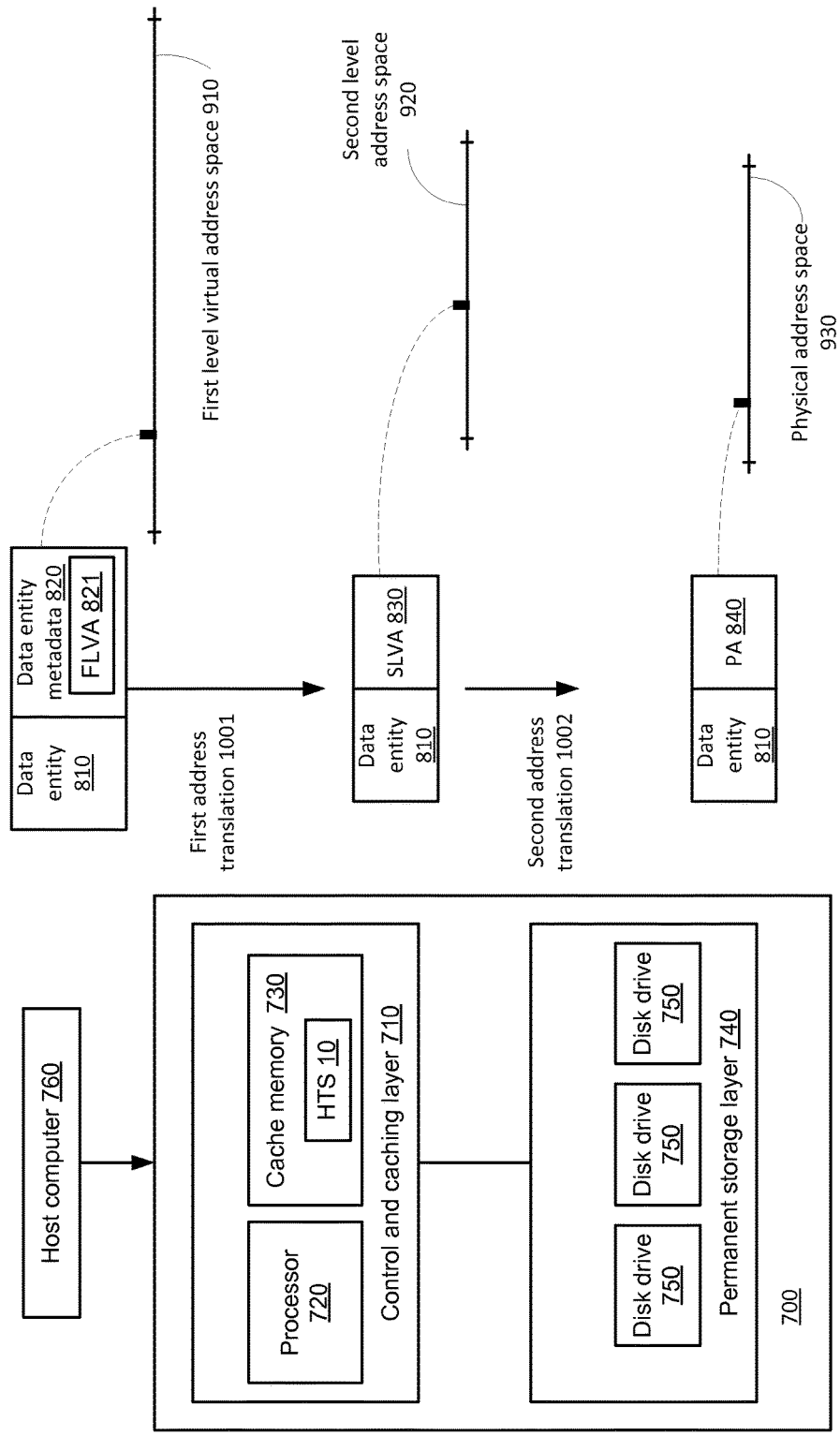
FIG. 7 illustrates a storage system, multiple address spaces and data entities according to an embodiment of the invention.

For example, a first level virtual address (see, for example, first level virtual address FLVA 821 of FIG. 7) may belong to a first level virtual memory space that is exposed to a user of the storage system or an application utilizing the storage provided by the storage system (see for example first level virtual address space 910 of FIG. 7 that is exposed to host computer 710) and a second level virtual address (see, for example, second level virtual address SLVA 822 of FIG. 7) may belong to a second level virtual memory space (see for example second level virtual address space 930 of FIG. 7 that is not exposed to host computer 710) that represents the actual physical storage space (see for example physical address space 930 of FIG. 7) of the storage system (denoted 700 in FIG. 7).

In the following example the hash mechanism is used for object storage, where the objects are of fixed size, S.

Object storage is a storage architecture that manages data as objects, wherein each object includes the data and metadata. Each object is assigned with a globally unique identifier, called object-ID.

The hash mechanism translates an identifier of an object (object ID) into an address in a storage space where the object is stored. The key is the object ID and the value is the address. Note that the hash tables described herein do not include the address, which can be inferred from the table index and the entry index within the table. In the following example, it is assumed that the storage space is a sparse logical volume and the address is an offset (also referred to as logical address) within the volume. Logical address space does not consume physical storage space (e.g. disk space) and may consume only minimal system resources (e.g., memory tables), therefore maintaining the hash tables described herein, that points to a sparse address space, i.e., an address space which covers twice the size of the size occupied by the maximum supported objects, is not a waste of resources. However the storage space can also be a physical storage space, e.g., a memory, a disk or an array of disks and the address can be a physical address within the memory, disk or array of disks.

The first hash table is addressed by entry-indices (between 1 to N1) calculated by applying the first hash function on object identifiers. The first hash table includes N1 entries, which conforms to the number of N1 objects supported by the system.

Since all the objects are of fixed size (S), the index of the entry produced for an object dictates the location of the object in the volume. For example, suppose an index that equals n1 (1<=n1<=N1) is produced by applying the first hash function on the identifier of a first object and there is no collision. It can be determined that the offset (or logical address) of the first object within the volume is (n1−1)*S.

When adding a second object whose index is also calculated to be n1, while the n1'th entry is occupied by the first object's key, the second hash table is used for hosting the second object's key, and a second hash function is used to calculate a second index for the second object. The second index points to an entry in the second hash table. Suppose the second index equals n2, the address in the logical volume for storing the second object is: N1*S+(n2−1)*S.

If the entry n2 in the second hash table is also occupied, then a third hash function will produce an index into a third hash table, and so on.

An object whose key is represented by a $n_k$ index in the k'th hash table, is associated with an address in (for example) the logical volume which is the total number of entries in the (k−1) tables multiplied by the fixed size S, plus the number of preceding entries in the k'th table multiplied by S, or as demonstrated by the formula:

$$address = S*(nk-1) + S*\Sigma_{i=1}^{k-1} Ni$$

Figure 2:
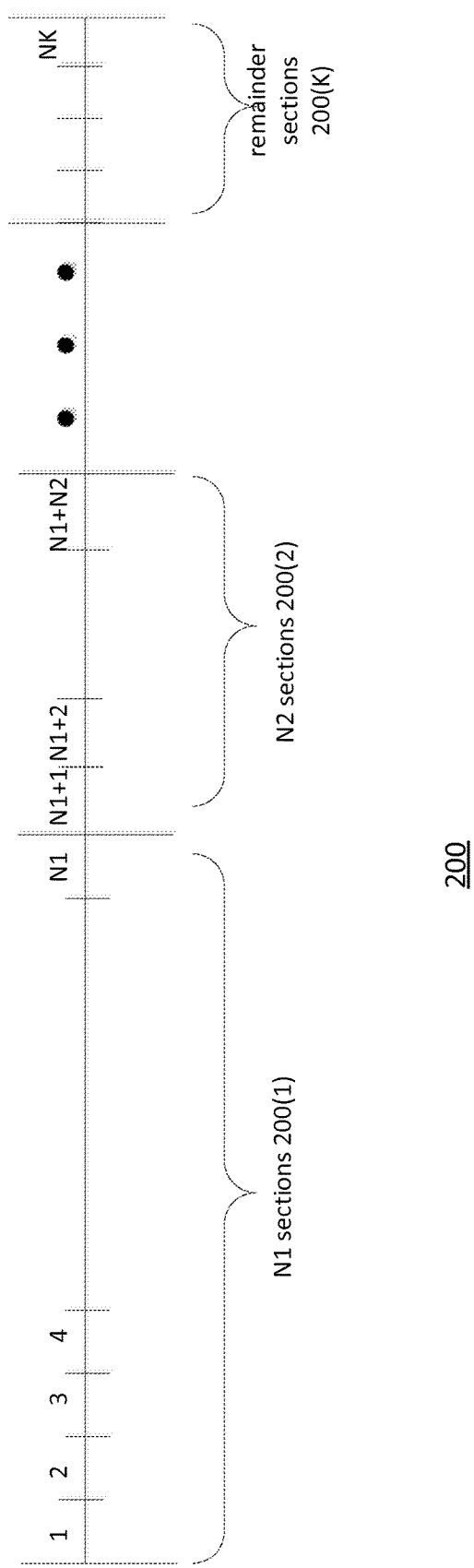
FIG. 2 illustrates a logical volume according to an embodiment of the invention.

FIG. 2 illustrates an address space of the logical volume 200 according to an embodiment of the invention.

The first N1 sections 200(1) of the logical volume 200 are reserved for data of objects whose keys are handled by the first hash table (10(1) of FIG. 1).

Each first section 200(1) is of a fixed size, S.

The next N2 sections 200(2) of logical volume 200 are reserved for data of objects whose keys are handled by the second hash table (10(2) in FIG. 1), and so on.

The end of the logical volume 200 includes few sections 200(K) reserved to data of the remainder of the objects (the K'th hash table 10(K) of FIG. 1), those object whose keys collided with other keys when applying any of the hash functions. There are only few sections, in this example —4, as it is expected to be only few remained objects.

Figure 3:
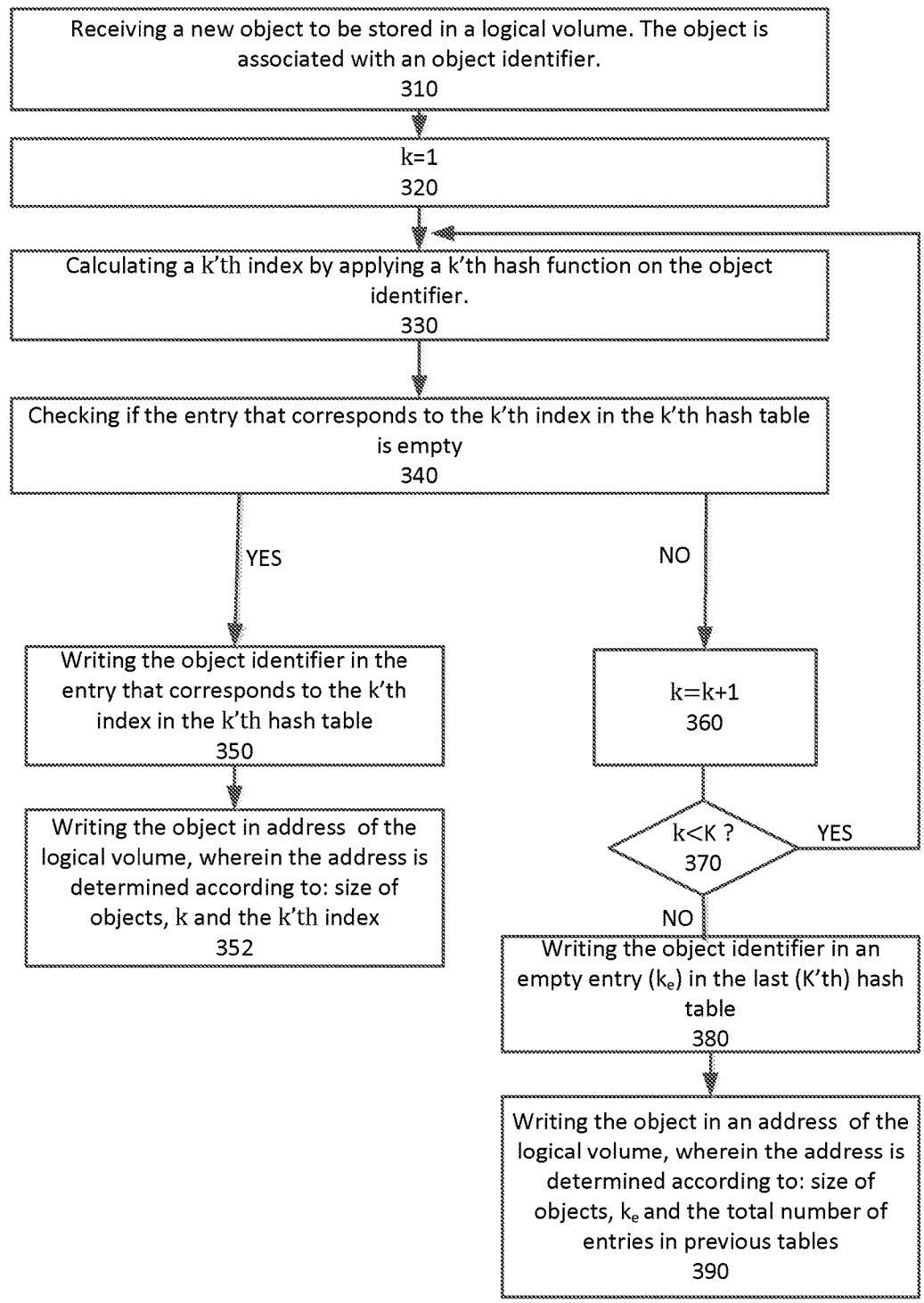
FIG. 3 illustrates a method according to an embodiment of the invention.

FIG. 3 illustrates a method 300 for adding a new object to the storage system and according to an embodiment of the invention.

Method 300 may start by stage 310 of receiving a new object to be stored in a logical volume. The object is associated with an object identifier.

Stage 310 may be followed by stage 320 of setting control variable k to 1.

Stage 320 may be followed by stage 330 of calculating a k'th index by applying a k'th hash function on the object identifier.

Stage 330 may be followed by stage 340 of checking if the entry that corresponds to the k'th index in the k'th hash table is empty.

If the answer is positive (the entry is empty) then stage 340 may be followed by stage 350 of writing the object identifier in the entry that corresponds to the k'th index in the k'th hash table.

Stage 350 may be followed by stage 352 of writing the object in address of the logical volume, wherein the address is determined according to: size of objects, k and the k'th index.

This address may be calculated by adding, to a base address, a product of the fixed size of the object multiplied by the order of the entry within the set of hash tables. S being the fixed size, nk being the value of the index and Nk being the number of entries per the k'th hash table provide (ignoring, for simplicity of explanation a base address—if such base address differs from zero):

$$address = S*(nk-1) + S*\sum_{i=1}^{k-1} Ni$$

If the answer is negative (the entry is not empty) then stage 340 may be followed by stage 360 of incrementing k (k=k+1).

Stage 360 may be followed by stage 370 of checking if all the hash tables except the last hash table were not yet evaluated (k<K ?).

If there are still more hash tables to evaluate except the last hash table then jumping to stage 330.

Else—jumping to stage 380 of writing the object identifier in an empty entry ($k_e$) in the last (K'th) hash table.

Stage 380 may be followed by stage 390 of writing the object in an address of the logical volume, wherein the address is determined according to: size of objects, $k_e$ and the total number of entries in previous tables. The address may be calculated by:

$$address = S*(nK-1) + S*\sum_{i=1}^{K-1} Ni$$

Figure 4:
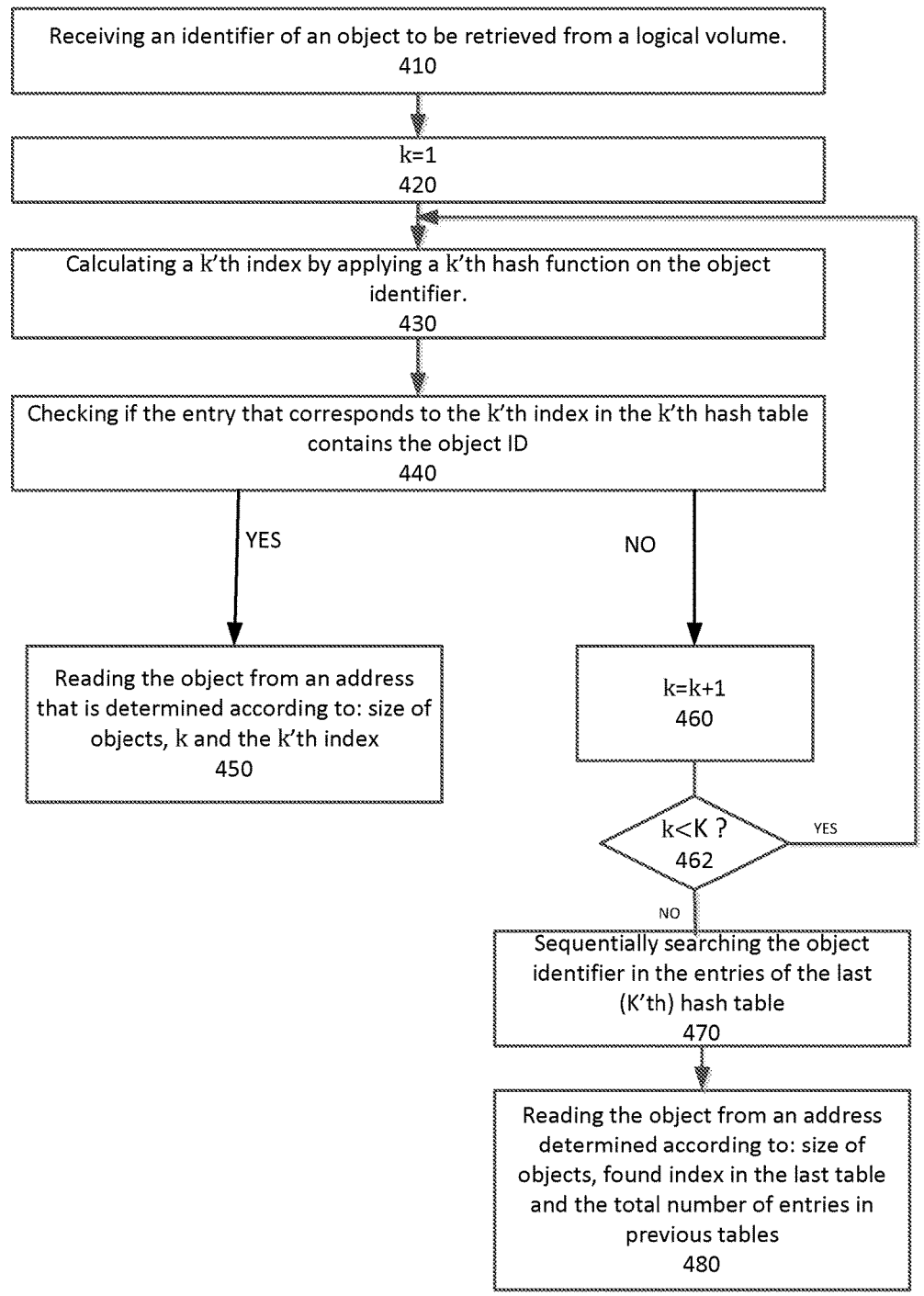
FIG. 4 illustrates a method according to an embodiment of the invention.

FIG. 4 illustrates a method 400 for retrieving an existing object according to its object identifier and according to an embodiment of the invention.

Method 400 may start by stage 410 of receiving an identifier of an object to be retrieved from a logical volume.

Stage 410 may be followed by stage 420 of setting control variable k to 1.

Stage 420 may be followed by stage 440 of calculating a k'th index by applying a k'th hash function on the object identifier.

Stage 430 may be followed by stage 440 of checking a match—evaluating if the entry that corresponds to the k'th index in the k'th hash table contains the object ID.

If the answer is positive (there is a match) then stage 440 may be followed by stage 450 of reading the object from an address that is determined according to: size of objects, k and the k'th index.

S being the fixed size, nk being the value of the index and Nk being the number of entries per the k'th hash table provide:

$$address = S*(nk-1) + S*\sum_{i=1}^{k-1} Ni$$

If the answer is negative (no match) then stage 440 may be followed by stage 460 of incrementing k (k=k+1).

Stage 460 may be followed by stage 462 of checking if all the hash tables except the last hash table were not yet evaluated (k<K ?).

If there are still more hash tables to evaluate except the last hash table then jumping to stage 330.

Else—jumping to stage 470 of sequentially searching the object identifier in the entries of the last (K'th) hash table.

Stage 470 may be followed by stage 480 of reading the object from an address determined according to: size of objects, found index in the last table and the total number of entries in previous tables.

Any type of data units of fixed size and having an identifier, other than the objects described above, can be handled by a storage system with the aid of the described hash mechanism, for translating the identifier into an address in a storage space. The identifier that forms the key may be, for example, a virtual address within a first virtual address space and the hash mechanism enables translating the virtual address into an index and then into another virtual address within a second virtual address space or into a physical address within a physical resource, e.g. an address in a memory. The data entity metadata serves as a key for accessing an entry of the data entity in the following described set of data structures or for selecting a new entry for the data entity being added.

Figure 5:
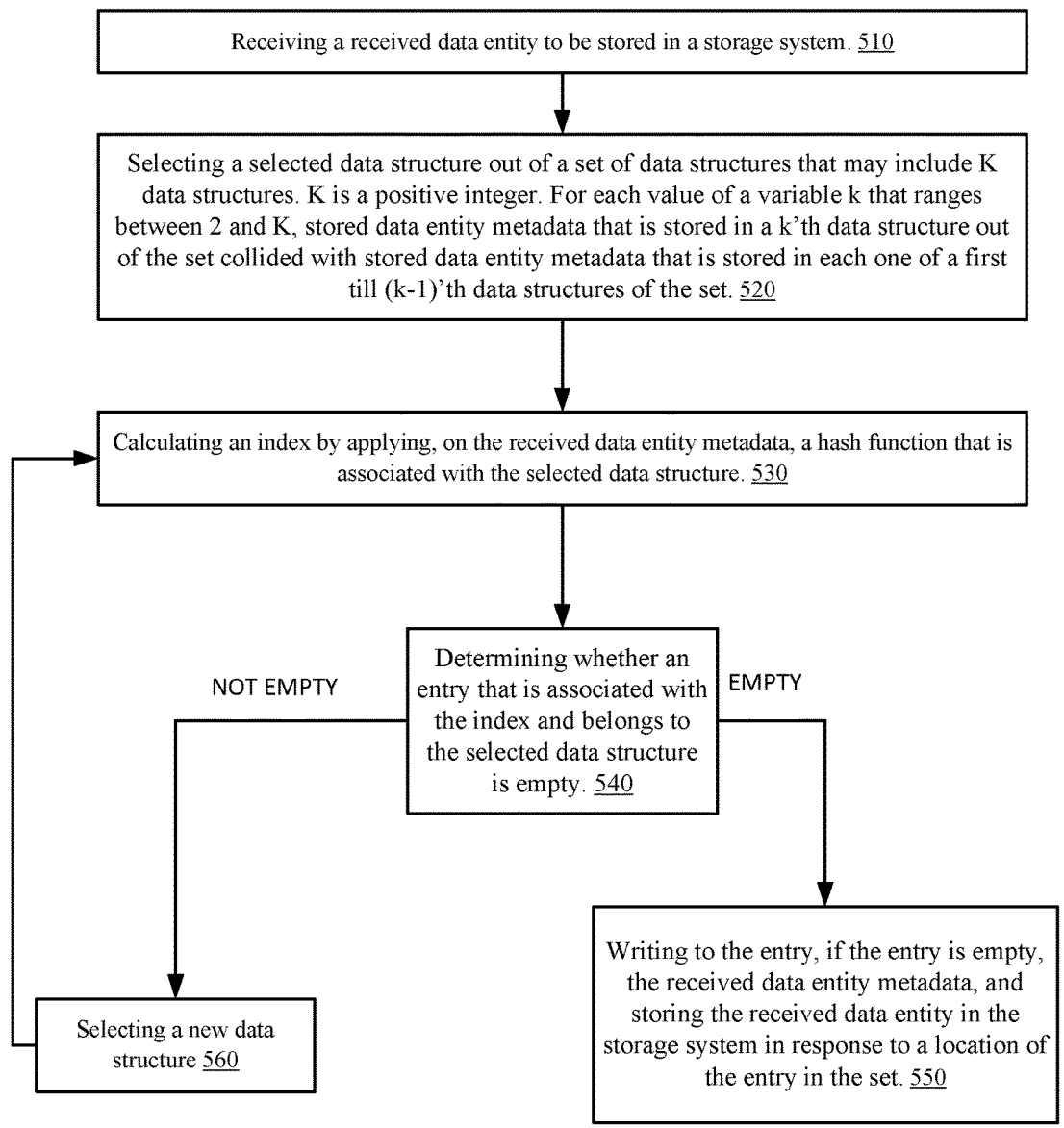
FIG. 5 illustrates a method according to an embodiment of the invention.

FIG. 5 illustrates a method 500 according to an embodiment of the invention.

Method 500 is for performing hash-based writing to a storage system.

Method 500 may start by stage 510 of receiving a received data entity to be stored in a storage system. The received data entity is associated with received data entity metadata. The received data entity metadata may be, for example, a received data entity identifier, a received data entity virtual address or any type of metadata related to the received data entity. The received data entity itself may include any combination of text, symbols, images, numbers and the like. FIG. 7 illustrates received data entity 810 and its received data entity metadata 820. The received data entity metadata 820 is shown as including a first level virtual address (FLVA) 821.

Stage 510 may be followed by stage 520 of selecting a selected data structure out of a set of data structures that may include K data structures. K is a positive integer. For each value of a variable k that ranges between 2 and K, stored data entity metadata that is stored in a k'th data structure out of the set collided with stored data entity metadata that is stored in each one of a first till (k−1)'th data structures of the set. Each entry, when full, stored a key that is data entity metadata. The number of entries in the k'th data structure may be the number of data entity keys expected to collide with keys stored in a (k−1)'th data structure.

The set of data structures may include hash tables such as the hash tables 10(1)-10(K) of FIG. 1. These data structures may differ than tables and may be organized in various other manners.

Referring to the example set forth in FIG. 1—the second hash table 10(2) includes data unit metadata of data entities that collided with already stored data unit metadata of the first hash table 10(1).

It is noted that each hash table is associated with its own hash function. There may be between 1 and K different hash functions associated with hash tables of the set of K hash tables.

The selection can be made in various manners. For example—the first selecting may include selecting the first hash table and the hash function associated with it. Multiple repetitions of the selection may result in scanning one hash table after the other so that if K repetitions are made the entire set is checked.

The data structures of the set may be concise in the sense that their entries may be limited to storing only stored data entity metadata or otherwise do not store the target addresses associated with the entries or pointers to collided keys.

Stage 520 may be followed by stage 530 of calculating an index by applying, on the received data entity metadata, a hash function that is associated with the selected data structure.

Stage 530 may be followed by stage 540 of determining whether an entry that is associated with the index and belongs to the selected data structure is empty. A non-empty entry indicates that there is a collision between an already stored data entity and the received data entity. An empty entry indicates that there is no collision.

If the entry is empty then stage 540 may be followed by stage 550 of writing to the entry, if the entry is empty, the received data entity metadata, and storing the received data entity in the storage system in response to a location of the entry in the set.

If, for example, method 500 is executed for performing a translation of a data entity address to a physical address of the received data entity then the physical address may correspond to the location of the entry in the set. If, for example, method 500 is executed for translating a data entity identifier to a virtual address of the received data entity then a virtual address assigned to the received data entity by the storage system corresponds to the location of the entry in the set of data structures (see, for example, FIG. 2).

For example, the received data entity metadata may be a first level virtual address, the stored entity address may be a second level virtual address and method 500 may include performing first level virtual address to second level virtual address and then a second level virtual address to physical address translation. The first level virtual address may belong to a first level virtual memory space that is exposed to a user of the storage system and the second level virtual address may belong to a second level virtual memory space that represents the actual physical storage space of the storage system or any other internal address representation that is used inside the storage system.

It is further noted that the physical address itself may be translated to another level physical address.

If the entry is empty then stage 540 may be followed by stage 560 of selecting, if the entry is not empty, a new data structure and jumping to stage 530 thereby repeating at least the stages of calculating (530) and determining (540).

The received data entity may be an object and the received data entity metadata may be an object identifier. This corresponds to an object storage system. As for another example, the data entity may be a file in an environment of fixed size files, the data entity metadata may be a filename or any other file identifier and the method may perform a filename to a logical address translation.

Figure 6:
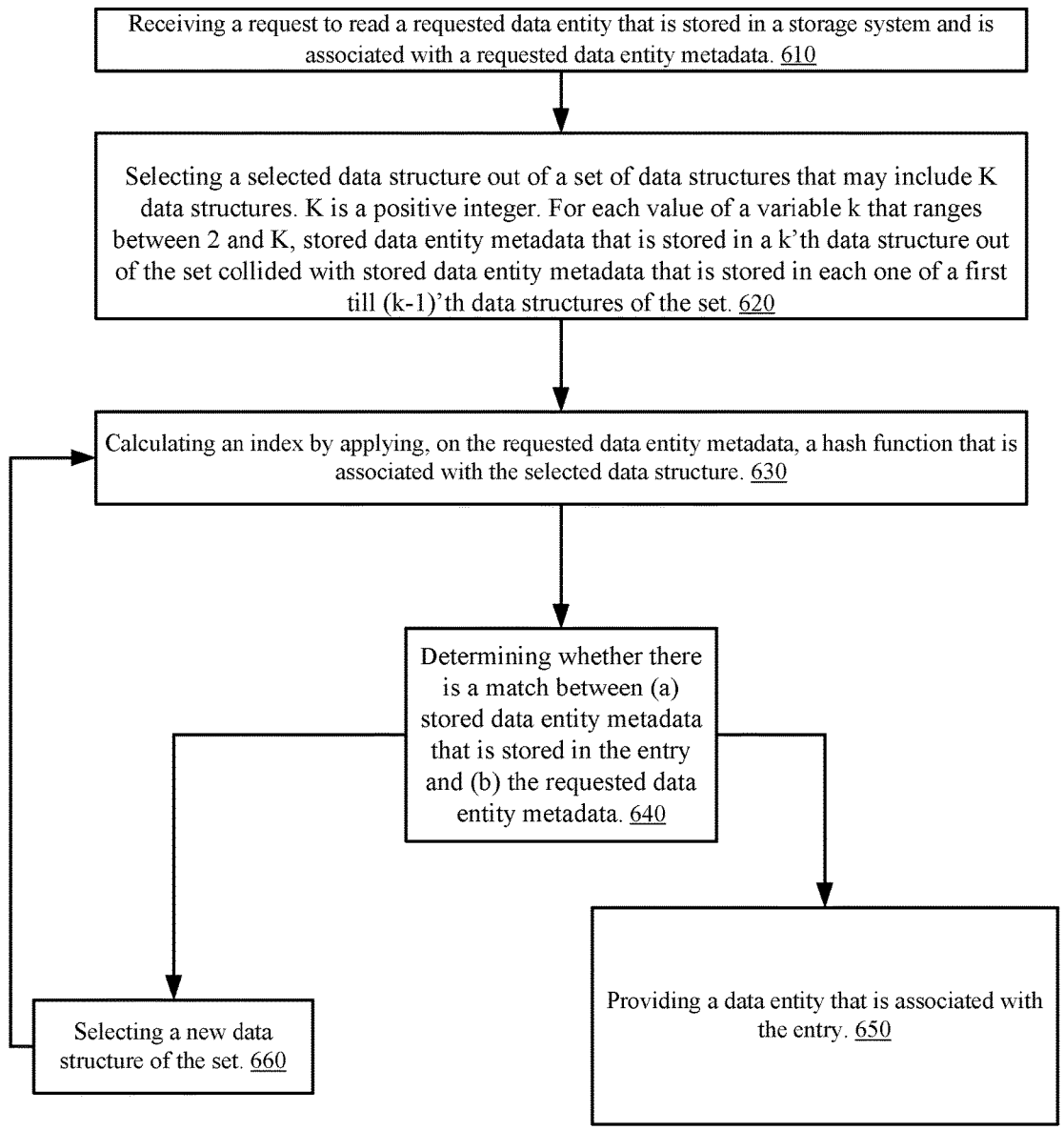
FIG. 6 illustrates a method according to an embodiment of the invention.

FIG. 6 illustrates a method 600 according to an embodiment of the invention.

Method 600 may start by stage 610 of receiving a request to read a requested data entity that is stored in a storage system and is associated with a requested data entity metadata.

Stage 610 may be followed by stage 620 of selecting a selected data structure out of a set of data structures that comprises K data structures. K is a positive integer. For each value of a variable k that ranges between 2 and K, stored data entity metadata that is stored in a k'th data structure out of the set collided with stored data entity metadata that is stored in each one of a first till (k−1)'th data structures of the set.

Stage 620 may be followed by stage 630 of calculating an index by applying, on the requested data entity metadata, a hash function that is associated with the selected data structure.

Stage 630 may be followed by stage 640 of determining whether there is a match between (a) stored data entity metadata stored in an entry that is associated with the index and (b) the requested data entity metadata. Stage 640 may be followed by stage 650 of providing, if there is a match, a data entity that is associated with the entry.

The providing includes reading the data entity from an address that is calculated according to the selected data structure and index (and size).

Stage 640 may be followed by stage 660 of selecting, if there is no match, a new data structure of the set and repeating at least the stages of calculating the index and determining whether there is a match. For example, for k between 1 and (K−1) if the k'th data structure does not include a matching data entity metadata then stage 660 includes selecting the (k+1)'th data structure and jumping to stage 630.

It is noted that methods 500 and 600 may perform the repetition of stages in serial, in a partially overlapping manner or in parallel. For example, multiple hash functions may be applied to provide multiple indexes and the entries associated with these indexes may be checked in parallel.

FIG. 7 illustrates a storage system 700, multiple address spaces 910, 920 and 930 and data entity 810 according to an embodiment of the invention.

The storage system 700 is illustrated as including a control and caching layer 710 and a permanent storage layer 740 that includes multiple disk drives. The control and caching layer 710 is coupled to one or more host computers such as host computer 760.

The control a layer 710 is illustrated as including a processor 720 and a memory 730 and may interface between the host computer (and the first level virtual address space 910) and the permanent storage layer 740 (and its physical address space 930). The memory 730 may store hash table set (HTS) 10. The HTS 10 may be stored in other locations of the storage system.

FIG. 7 illustrates two address translations 1001 and 1002.

The first address translation 1001 is between a first level virtual address (FLVA 821) of a first level virtual address space 910 and a second level virtual address (SLVA 830) of a second level virtual address space 920.

The second address translation 1002 is between a second level virtual address (SLVA 830) of a second level virtual address space 920 and a physical address (PA 840) of a physical address space 930.

It is noted that any one of the first and second address translations may use the hash mechanism illustrated in the specification. It is further noted that a storage system may perform one, three or more different address translations. For example, there may be more than two levels of virtual address spaces, a single level of virtual address spaces, more than a single level of physical address spaces and the like.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, state bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

I claim:

1. A method for hash-based writing, the method comprises:
   receiving a received data entity to be stored in a storage system, wherein the received data entity is associated with received data entity metadata;
   selecting a selected data structure out of a set of data structures that comprises multiple (K) data structures; wherein for each value of a variable k that ranges between 1 and K, each k'th data structure of the set is associated with a k'th hash function for producing indices for the k'th data structure; wherein for each value of the variable k that ranges between 2 and K, the k'th data structure includes stored data entity metadata that collided with stored data entity metadata that is stored in each one of a first till (k−1)'th data structures of the set when applying any of a first to (k−1)'th hash functions; wherein each data structure of the set comprises multiple entries for storing multiple data entity metadata, and wherein different data structures comprise different number of entries;
   calculating an index by applying, on the received data entity metadata, a hash function that is associated with the selected data structure; wherein the hash function is different from a hash function that produced the received data entity metadata;
   determining whether an entry that is associated with the index and belongs to the selected data structure is empty;
   if the entry is empty: writing the received data entity metadata to the entry; calculating a target address within an address space of the storage system, based at least on a location of the entry in the set, wherein the location of the entry in the set comprises the index and a value of the variable k that represents the selected data structure; and storing the received data entity at the target address; wherein each entry of the set does not store the target address, thereby reducing the size of the set; and
   selecting, if the entry is not empty, a new data structure of the set and repeating at least the stages of calculating and determining.

2. The method according to claim 1 wherein the received data entity is an object and the received data entity metadata is an object identifier.

3. The method according to claim 1 wherein K repetition of the selecting of the selected data structure results in scanning the set, starting from a first data structure.

4. The method according to claim 1 wherein each entry of the set only stores a received data entity metadata of a received data entity that is associated with the entry.

5. The method according to claim 1 wherein the target address is a physical address and wherein the method comprising storing the received data entity at the physical address.

6. The method according to claim 1 wherein the target address is a virtual address and wherein the method comprising storing the received data entity at the virtual address.

7. A method for hash-based reading, the method comprises:
   receiving a request to read a requested data entity that is stored in a storage system and is associated with a requested data entity metadata;
   selecting a selected data structure out of a set of data structures that comprises multiple (K) data structures; wherein for each value of a variable k that ranges between 1 and K, each k'th data structure of the set is associated with a k'th hash function for producing indices for the k'th data structure; wherein for each value of the variable k that ranges between 2 and K, the k'th data structure includes stored data entity metadata that collided with stored data entity metadata that is stored in each one of a first till (k−1)'th data structures of the set when applying any of a first to (k−1)'th hash functions; wherein each data structure of the set comprises multiple entries for storing multiple data entity metadata, and wherein different data structures comprise different number of entries;
   calculating an index by applying, on the requested data entity metadata, a hash function that is associated with the selected data structure; wherein the index is associated with an entry of the selected data structure; wherein the hash function is different from a hash function that produced the received data entity metadata;
   determining whether there is a match between (a) stored data entity metadata that is stored in the entry and (b) the requested data entity metadata;
   if there is a match:, calculating a target address within an address space of the storage system, based at least on a location of the entry in the set, wherein the location of the entry in the set comprises the index and a value of the variable k that represents the selected data structure; and providing a data entity from the target address; wherein each entry of the set does not store the target address, thereby reducing the size of the set; and
   selecting, if there is no match, a new data structure of the set and repeating at least the stages of calculating the index and determining whether there is a match.

8. The method according to claim 7 wherein the requested data entity is an object and the requested data entity metadata is an object identifier.

9. The method according to claim 7 wherein the stored data entity is a stored object and the stored data entity metadata comprises an object identifier of the stored object.

10. The method according to claim 7 wherein K repetition of the selecting of the selected data structure result in scanning the set, starting from a first data structure.

11. The method according to claim 7 wherein the data entity is stored at the target address.

12. The method according to claim 7 wherein each entry of the set only stores stored data entity metadata of the received data entity that is associated with the entry.

13. The method according to claim 7 wherein the target address is a physical address in which the data entity is stored.

14. The method according to claim 7 wherein the target address is a virtual address assigned to the data entity by the storage system.

15. A non-transitory computer readable medium that stores instructions that once executed by a computer causes the computer to perform the stages of:
   receiving a received data entity to be stored in a storage system, wherein the received data entity is associated with received data entity metadata;
   selecting a selected data structure out of a set of data structures that comprises multiple (K) data structures;

wherein for each value of a variable k that ranges between 1 and K, each k'th data structure of the set is associated with a k'th hash function for producing indices for the k'th data structure; wherein for each value of the variable k that ranges between 2 and K, the k'th data structure includes stored data entity metadata that collided with stored data entity metadata that is stored in each one of a first till (k−1)'th data structures of the set when applying any of a first to (k−1)'th hash functions; wherein each data structure of the set comprises multiple entries for storing multiple data entity metadata, and wherein different data structures comprise different number of entries;

calculating an index by applying, on the received data entity metadata, a hash function that is associated with the selected data structure; wherein the hash function is different from a hash function that produced the received data entity metadata;

determining whether an entry that is associated with the index and belongs to the selected data structure is empty;

if the entry is empty: writing the received data entity metadata to the entry; calculating a target address within an address space of the storage system, based at least on a location of the entry in the set, wherein the location of the entry in the set comprises the index and a value of the variable k that represents the selected data structure; and storing the received data entity at the target address; wherein each entry of the set does not store the target address, thereby reducing the size of the set; and selecting, if the entry is not empty, a new data structure of the set and repeating at least the stages of calculating and determining.

16. A storage system that comprises a processor, a memory and a permanent layer;

wherein the processor is arranged to receive a received data entity to be stored in a storage system, wherein the received data entity is associated with received data entity metadata;

select a selected data structure out of a set of data structures; wherein the hash function is different from a hash function that produced the received data entity metadata;

calculate an index by applying, on the received data entity metadata, a hash function that is associated with the selected data structure;

determine whether an entry that is associated with the index and belongs to the selected data structure is empty;

if the entry is empty: write the received data entity metadata to the entry, and calculate a target address within an address space of the storage system, based at least on a location of the entry in the set;

wherein the permanent layer is arranged to store the received data entity at the target address;

wherein the processor is further arranged to select, if the entry is not empty, a new data structure of the set and repeating at least the stages of calculating and determining;

wherein the memory is arranged to store the set of data structures; wherein the set of data structures comprises multiple (K) data structures; wherein for each value of a variable k that ranges between 1 and K, each k'th data structure of the set is associated with a k'th hash function for producing indices for the k'th data structure; wherein for each value of the variable k that ranges between 2 and K, the k'th data structure includes stored data entity metadata that collided with stored data entity metadata that is stored in each one of a first till (k−1)'th data structures of the set when applying any of a first to (k−1)'th hash functions; wherein each data structure of the set comprises multiple entries for storing multiple data entity metadata, and wherein different data structures comprise different number of entries; wherein each entry of the set does not store the target address, thereby reducing the size of the set;

wherein the location of the entry in the set comprises the index and a value of the variable k that represents the selected data structure.

* * * * *